United States Patent [19]
Robertson, III

[11] Patent Number: 5,699,995
[45] Date of Patent: Dec. 23, 1997

[54] PIVOTING VALVE ASSEMBLY

[75] Inventor: Walter D. Robertson, III, Harleysville, Pa.

[73] Assignee: Emerson Electric Co., St. Louis, Mo.

[21] Appl. No.: 615,078

[22] Filed: Mar. 13, 1996

Related U.S. Application Data

[63] Continuation-in-part of Ser. No. 457,402, Jun. 1, 1995.

[51] Int. Cl.$^6$ .................................................. F16K 31/06
[52] U.S. Cl. ........................... 251/129.15; 251/231
[58] Field of Search ....................... 251/129.17, 129.15, 251/129.2, 129.01, 215, 231, 236, 239

[56] References Cited

U.S. PATENT DOCUMENTS

| | | | |
|---|---|---|---|
| 2,057,231 | 10/1936 | Dawson | 251/231 |
| 2,770,666 | 11/1956 | Knight. | |
| 3,313,317 | 4/1967 | Mosier | 251/231 X |
| 3,692,057 | 9/1972 | Barnd. | |
| 4,783,047 | 11/1988 | Baltus et al.. | |

FOREIGN PATENT DOCUMENTS

| | | | |
|---|---|---|---|
| 0057969 | 1/1982 | European Pat. Off.. | |
| 3528072 | 2/1987 | Germany. | |
| 481335 | 3/1969 | Switzerland. | |
| WO8501562 | 4/1985 | WIPO | 251/231 |

*Primary Examiner*—Kevin Lee
*Attorney, Agent, or Firm*—Polster, Lieder, Woodruff & Lucchesi

[57] ABSTRACT

An pivot valve assembly (1310) for use in a fluid flow system (S). A valve body (1312) has a fluid flow path therethrough and includes an inlet (1314), an outlet (1316), and a valve orifice (1318) formed intermediate the inlet and outlet. A valve member (1332) is mounted for movement relative to the orifice to open and close the fluid path. A solenoid assembly (1362) is supplied an input from a sensor/control unit (S) to effect movement of the valve member. The solenoid acts on a lever arm (1352) which is pivotally mounted so what would otherwise be a linear movement of the lever arm becomes a rotary movement. A ball (1342) seated on a valve stem (1336) of the valve member is contacted by the lever arm and moved thereby as the lever arm moves. This produces a pivotal movement of the valve member into a position opening the orifice and allowing fluid flow through the valve assembly.

24 Claims, 7 Drawing Sheets

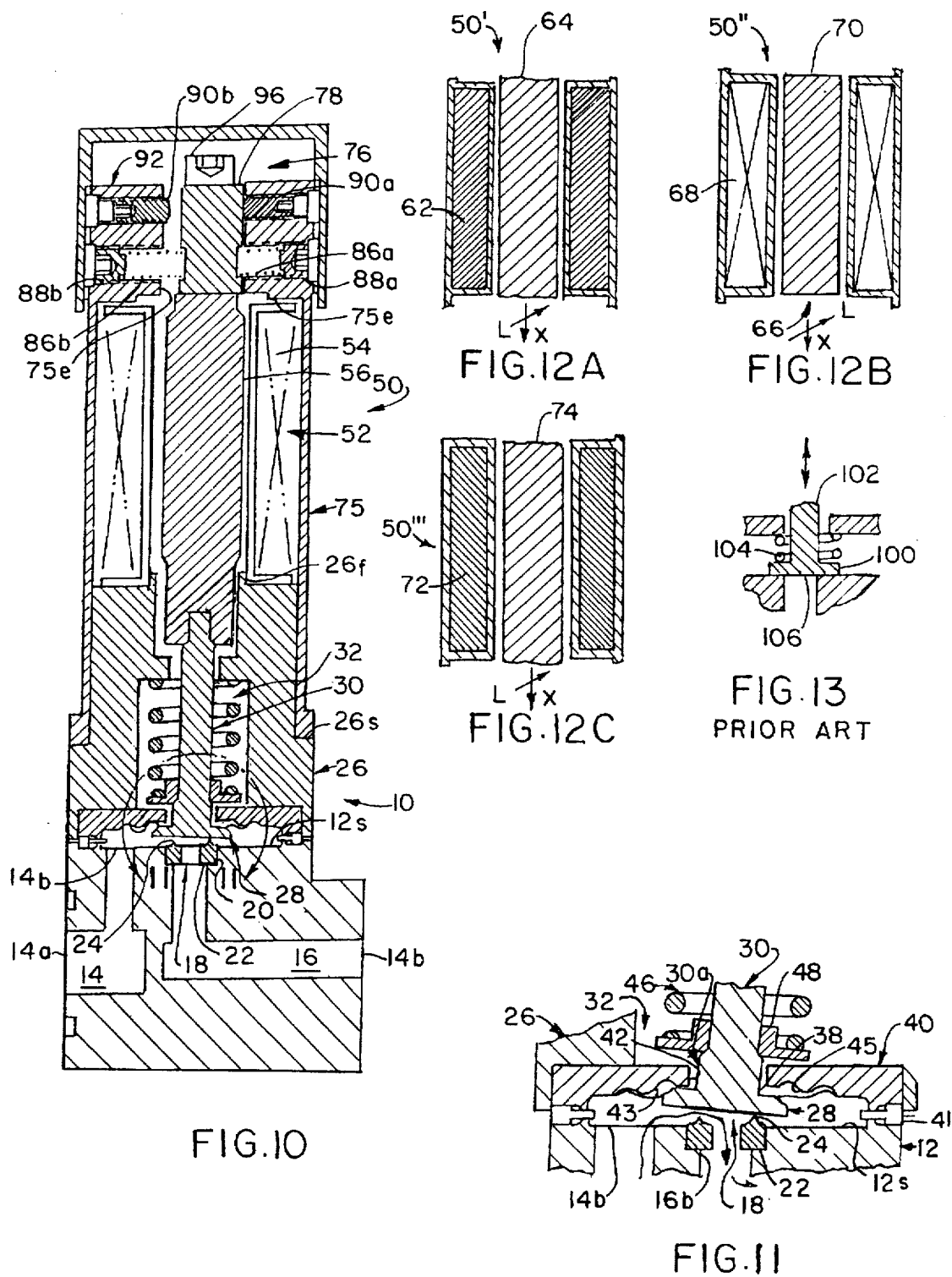

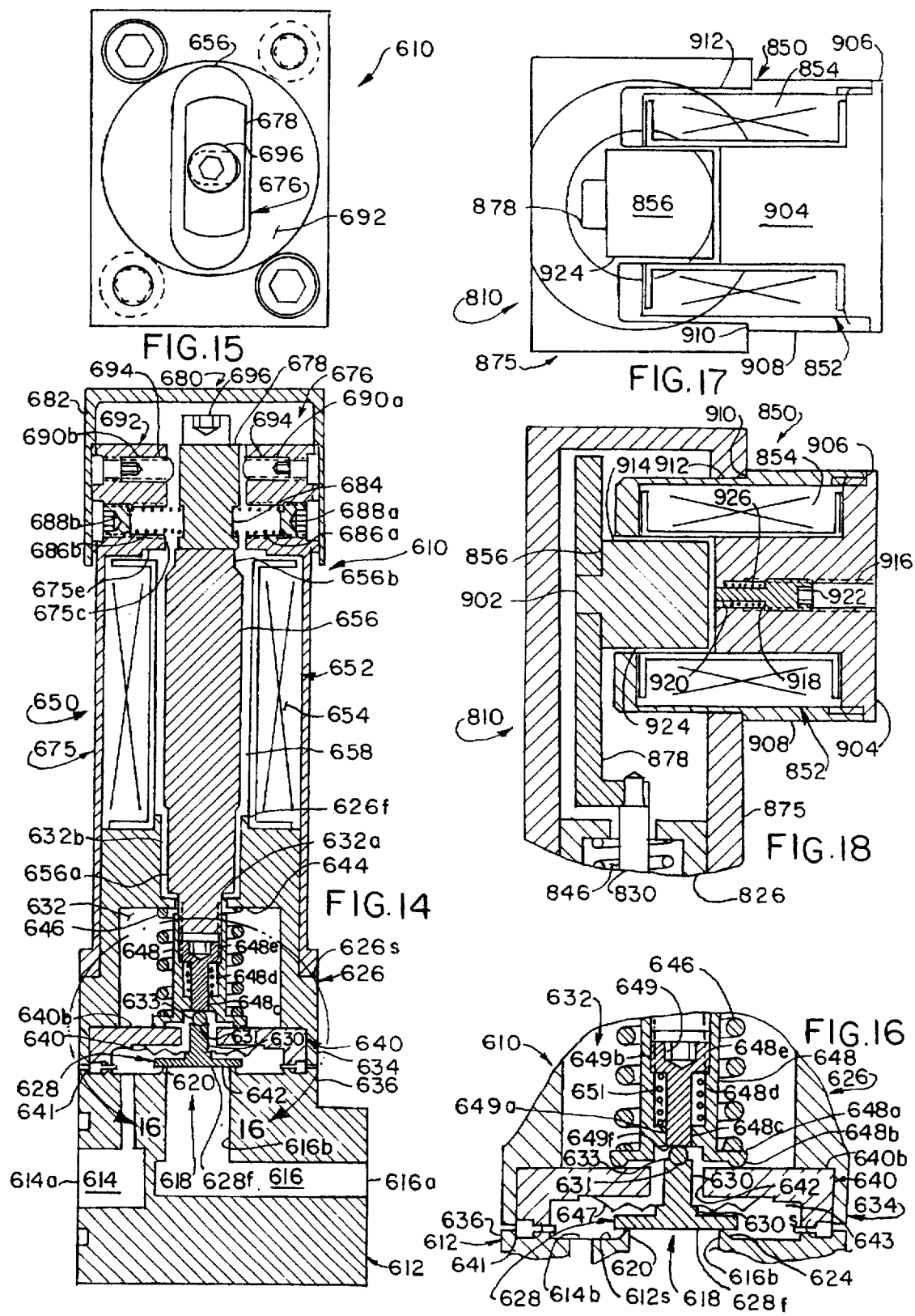

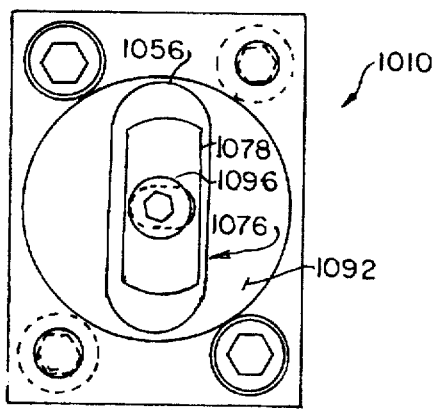
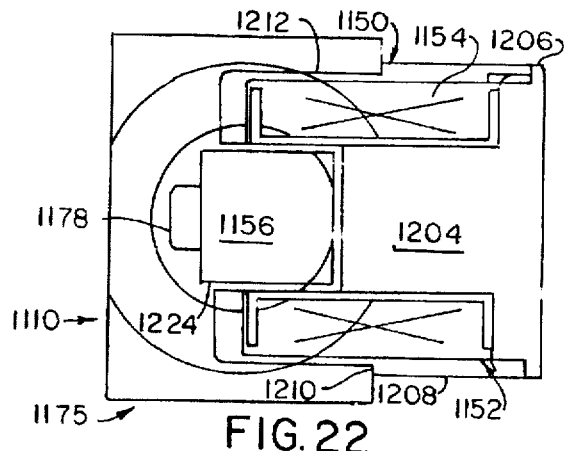
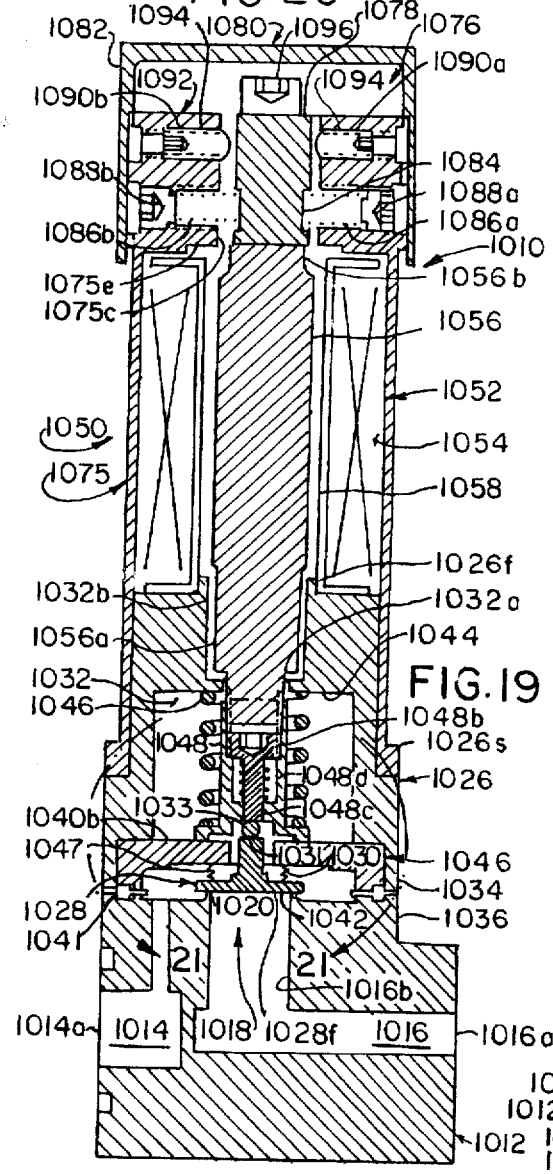
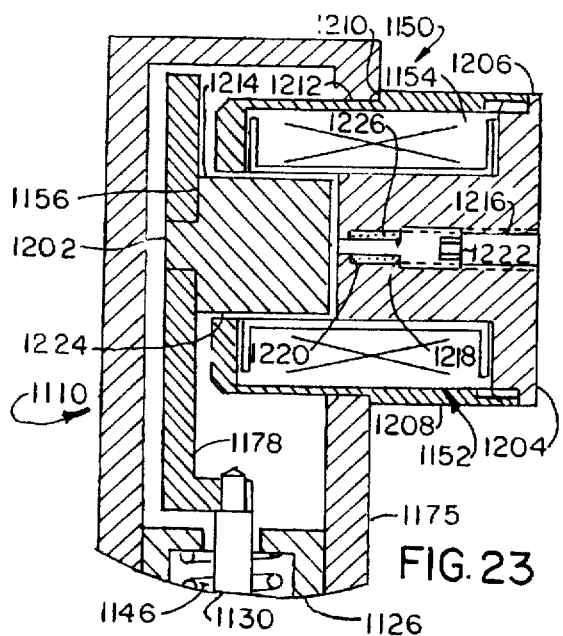
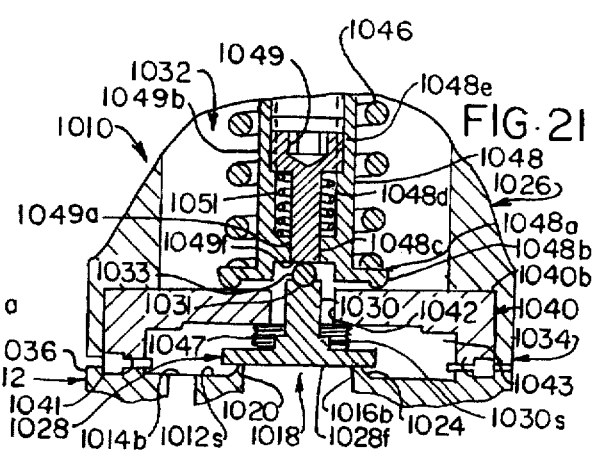

PIVOTING VALVE ASSEMBLY

CROSS REFERENCE TO RELATED APPLICATIONS

This application is a continuation-in-part of U.S. patent application Ser. No. 08/457,402 filed Jun. 1, 1995 entitled PIVOTING VALVE ASSEMBLY.

BACKGROUND OF THE INVENTION

This invention relates to fluid flow control devices and more particularly to a valve assembly in which a control valve is pivotally movable with respect to a valve seat to control fluid flow through the valve and by using lateral forces on the valve to change to the flow area through an orifice in the valve. The pivoting valve assembly is particularly useful in manufacturing or process environments where extremely high levels of cleanliness are required.

Flow control valves are used in a wide variety of applications to control the flow of fluid from one point in a system to another. In conventional flow control valves, fluid flow is modulated or controlled by increasing or decreasing the flow area between a valve seat and an orifice with which the valve seat is associated. Various types of actuators are used to effect movement of a valve seat relative to the orifice. The type of actuator used depends to some extent to the particular application of a control valve. However, an important factor in each instance is the degree of resolution which is achieved between an applied input to the valve and the resulting change in fluid flow. A valve exhibiting greater resolution or range of control permits greater design flexibility and enhanced system performance.

In conventional control valves, the valve is moved in a linear direction With respect to an orifice. The degree of movement exposes a greater or lesser amount of flow area. Also, both the valve seat and the orifice are typically made or formed of metal. With a metal-to-metal seal, a large force must be employed to effect a tight seal. This force must then be overcome by the actuator to open the valve. The cost of a control valve is, to a major degree, a function of the force required to be exerted on the valve to obtain a particular amount of flow control resolution. As a result, some fluid systems wind up employing very expensive valves even where the level of resolution is not especially precise. It would be helpful therefore to have available a control valve with which a high degree of resolution can be achieved; but which, at the same time, does not need to employ near the degree of force required in conventional control valves to achieve the resolution required.

In manufacturing environments where extremely high levels of cleanliness must be maintained, conventional valve constructions and operations are inadequate to maintain the desired level of cleanliness. An example of this type of manufacturing environment is in the semiconductor industry. This industry has very stringent requirements with respect to particle generation and cleanliness. With conventional valve constructions, it is not uncommon for small, sub-micron size particles to be produced during valve operation. These particles result in contamination of semiconductors being produced. So, too, does the introduction of contaminants which are introduced through a valve because the degree of resolution of the valve is not sufficient to keep a contaminant from flowing through the valve. It is therefore very important for the industry to have available valves for use in the semiconductor fabrication process which do not contaminate the process and is capable of being controlled to the degree which do not allow contaminants to flow through the process.

SUMMARY OF THE INVENTION

Among the several objects of the present invention is the provision of a control valve and valve assembly for use in fluid flow control systems; the provision of such a control valve employing a unique operational approach to achieve a high degree of resolution without having to employ the level of force required to be employed by conventional control valves to achieve a comparable degree of resolution; the provision of such a control valve which is a pivot valve which operates by pivotally moving a valve seat about an orifice to effect opening of the orifice, rather than moving the valve seat in a linear direction with respect to the orifice; the provision of such a pivot control valve employing a valve stem to which the seat is attached as a portion of a lever arm; the provision of such a pivot control valve in which a force is applied at the end of the lever arm remote from the valve seat so a much smaller force is required to obtain movement of the seat than is required in conventional control valves; the provision of such a pivot control valve which has a resolution on the order of thirteen times greater than that obtainable with comparable, conventional control valves; the provision of such a control valve having an adjustable length actuation mechanism to effect the resolution of the valve; the provision of such a pivotal control valve which obtains this higher degree of resolution by employing a lateral force on the lever arm at a substantial distance from the valve seat; the provision of such a pivot control valve which consumes less power than a comparable, conventional valve, the provision of such a pivot control valve which is safe in operation; the provision of such a pivot control valve in which a fluid media used in a process is isolated from the working portion of the valve; the provision of such a pivot control valve for use in manufacturing and fabrication processes requiring ultra clean environments; the provision of such a pivot control valve which is made of materials such as 316L V.A.R. which is corrosion resistant; the provision of such a pivot control valve to not generate particles which contaminate the process during use of the valve; the provision of such a pivot control valve to be controllable to a resolution by which sub-micron size particles are not passable through a valve orifice when the valve is opened; the provision of such a pivot control valve in which valve actuation is produced by exerting a lateral force on the valve stem or valve moving element to lift a valve member off its seat; and, the provision of such a pivot control valve which is small in size, is usable with a variety of actuators, has improved shut-off capability in addition to the improved resolution achieved when opening the valve, is less sensitive to pressure changes, and has a relatively simple conversion between normally closed and normally open operation.

In accordance with the invention, generally stated, an adjustable pivot valve assembly is for use in a fluid flow system. A valve body has a fluid flow path formed in it which includes an inlet, an outlet, and a valve orifice formed intermediate the inlet and outlet. A valve seat mounted for movement relative to the orifice seats against the orifice to close the flow path. The valve seat is attached to a valve stem to effect movement of the seat to open and close the orifice. What would be a linear movement of the valve stem and seat is translated into a lateral movement which is orthogonal to a longitudinal axis of the valve stem. This translated or converted movement causes the valve seat to pivotally move relative to the orifice to open the orifice for fluid to flow between the inlet and outlet. The valve stem comprises a portion of a lever arm which effects the pivoting movement. A solenoid assembly is supplied an input from a sensor/ control unit to effect valve member movement. The solenoid acts on the lever arm, and a ball seated on the valve stem is contacted by the lever arm to move as the lever arm moves. Other objects and features will be in part apparent and in part pointed out hereinafter.

BRIEF DESCRIPTION OF THE DRAWINGS

FIG. 10 is a sectional view of the valve assembly of FIG. 1 illustrating the pivoting motion of the valve;

FIG. 11 is a partial sectional view of the valve assembly taken along line 11—11 in FIG. 10;

FIGS. 12A-12C illustrate other means for moving a valve stem of the valve assembly;

FIG. 13 is partial sectional view of a conventional, prior art valve construction;

FIG. 14 is a sectional view of a fourth embodiment of the pivot valve assembly for use in the semiconductor industry;

FIG. 15 is a top plan view of the valve assembly of FIG. 14 with an assembly cover removed;

FIG. 16 is a partial sectional view of the valve assembly taken along line 16—16 in FIG. 14;

FIG. 17 is a top plan view of a pivot valve assembly in which an armature is laterally moved with respect to the central, longitudinal axis of the armature;

FIG. 18 is a partial elevational view, in section, of the pivot valve of FIG. 17;

FIG. 19 is a sectional view of a fifth embodiment of the pivot valve assembly employing a bellows rather than a diaphragm;

FIG. 20 is a top plan view of the valve assembly of FIG. 19 with an assembly cover removed;

FIG. 21 is a partial sectional view of the valve assembly taken along line 21—21 in FIG. 19

FIG. 22 is a top plan view of the pivot valve assembly of FIG. 16 with the armature laterally moved with respect to the central, longitudinal axis of the armature;

FIG. 23 is a partial elevational view, in section, of the pivot valve of FIG. 19;

Corresponding reference characters indicate corresponding parts throughout the drawings.

DESCRIPTION OF A PREFERRED EMBODIMENT

Figure 1:
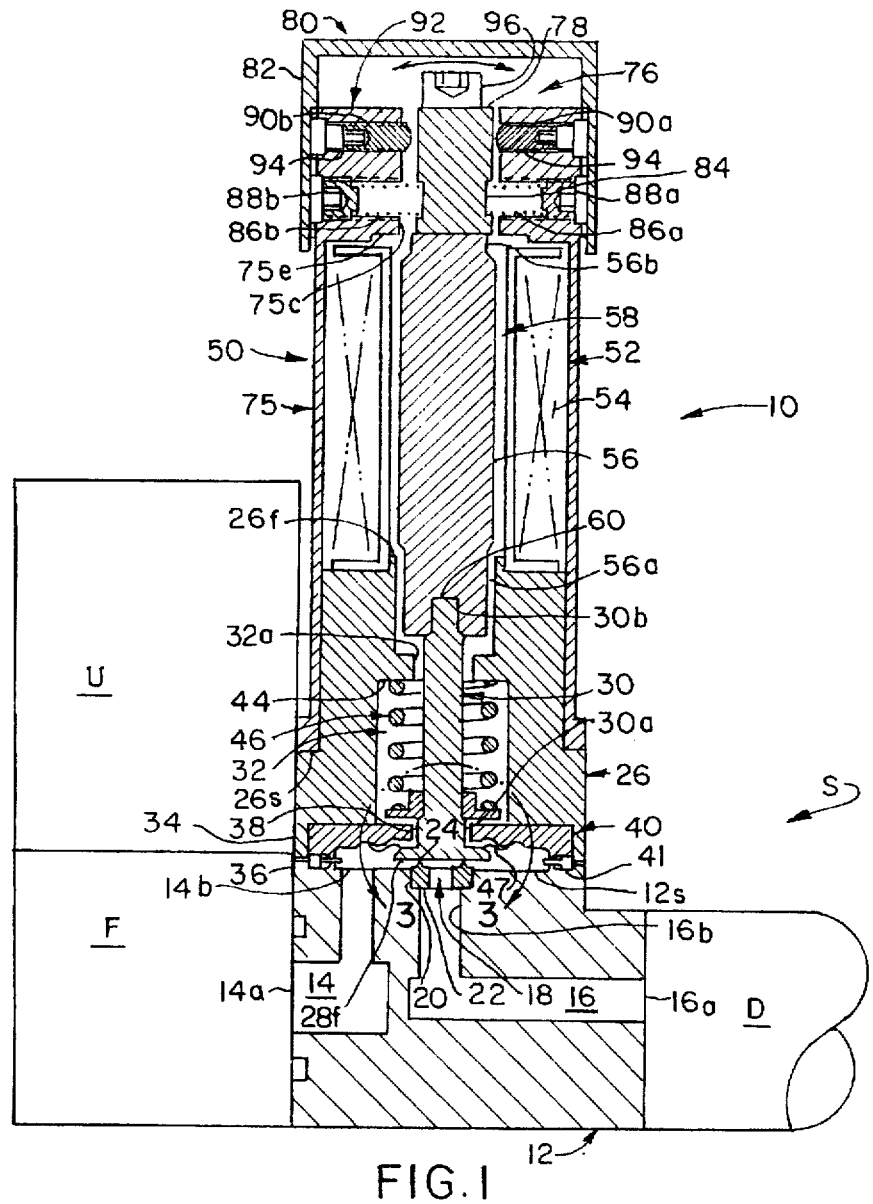
FIG. 1 is an elevational view, partly in section, of a first embodiment of a pivot valve assembly of the present invention.

Referring to the drawings, a valve assembly 10 of the present invention is for use in a fluid flow system S. The fluid flow system may be one of a variety used in various industries; for example, in the chemical or semiconductor fabrication industry. Or, the system including valve assembly 10 might be used in a pilot plant. Regardless, the valve assembly has a number of features which make it an attractive alternative to conventional, prior art valve constructions. As described hereinafter, valve assembly 10 requires a much smaller force to operate than conventional valves. It also provides a resolution factor at least an order of magnitude greater than conventional valves, and has a relatively simple conversion between normally closed and normally open valve positions. This higher degree of resolution is achieved by using laterally applied forces rather than linearly applied forces for controlling the opening and closing of a valve. Valve assembly 10 consumes less power than conventional valves. The valve can also be smaller than conventional valves used to perform the same function. Due to the reduction in the required forces, a smaller diameter diaphragm can be used to seal the valve. This diaphragm will have a smaller effective area which will make the valve less sensitive to pressure changes.

In FIG. 1, fluid flow system S is shown to include a fluid source F which is upstream of valve assembly 10, and a conduit D which is downstream of the valve assembly. A sensor/control unit U is used in conjunction with the valve assembly to control operation of the valve. The sensor portion of the unit may monitor, for example, the temperature of the fluid, its mass flow rate through the system, etc. In response to the sensed fluid conditions, the control unit will supply electrical signals to the valve assembly to control both opening and closing of the valve. In addition, the control signals will also control the degree of valve opening. The degree of opening controls the flow rate of fluid through the valve.

Figure 3:
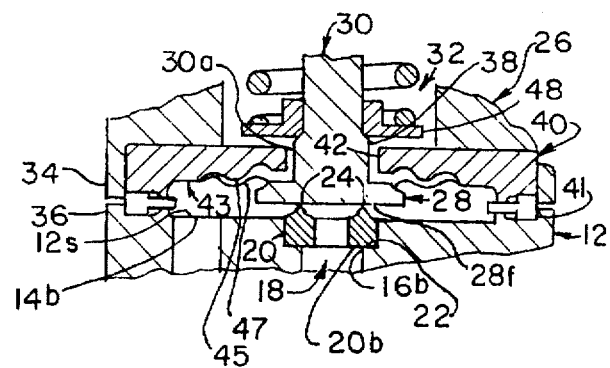
FIG. 3 is a partial sectional view of the valve assembly taken along line 3—3 in FIG. 1.

Valve assembly 10 first includes a valve body 12. The valve body is of a suitable metal or plastic material and an inlet 14 and an outlet 16 are formed in the valve body. Inlet 14 comprises an L-shaped passage having a first port 14a connecting with fluid source F, and a second port 14b opening into a sidewall 12s of the valve body. Outlet 16 similarly comprises an L-shaped passage. The outlet has a port 16a which opens into fluid conduit D of the system, and a port 16b which is also formed in sidewall 12s of the valve body. Ports 14b and 16b are spaced apart from one another. An orifice 18 which is interposed between inlet 14 and outlet 16 is formed at port 16b of outlet 16. The orifice comprises a circumferential collar 20 which is seated upon an annular shoulder 22 formed at port 16b. Collar 20 is formed of a suitable material. The collar has a base 20b which rests upon shoulder 22. The height of the collar is such that it extends slightly above sidewall 12s of the valve body as shown in FIGS. 1 and 3. The outer face of the collar is pointed or rounded, as indicated at 24 to define an edge.

Valve assembly 10 next includes body 26 for supporting and positioning a valve seat 28 which is mounted in body 26 for movement relative to orifice 18. Valve seat 28 comprises a circular plate whose diameter is greater than that of orifice 18. As is described hereinafter, seat 28 is movable between a first and valve closing position, in which a face 28f of the valve seat rests upon edge 24, and a second and valve opening position. The valve seat may be formed of metal, or plastic, or the seat may be of metal with an elastomeric insert.

Valve seat 28 has an associated valve stem 30. The valve stem has respective first and second ends 30a, 30b. Valve seat 28 is, for example, integrally formed on one end 30a of stem 30. Or, as is described hereinafter, the valve seat may be a separate element which is attachable to the one end of the valve stem. In any event, one of the valve ends has the valve seat associated with it. Body 26 has a longitudinal, central bore 32 extending the length of the body. The body has a circumferential shoulder 34 formed at one end. Valve body 12 has a corresponding circumferential shoulder 36 which abuts shoulder 34 when the valve is assembled. As shown in FIGS. 1 and 3, valve stem 30 has a central section of uniform diameter. If valve seat 28 is integrally formed with the one end of the stem, then at end 30a of the stem there is an enlarged diameter section 38. Plate 28 is formed at the outer end of section 38.

A plate or insert 40 has an outer diameter sized for the insert to fit into the cavity or chamber defined by shoulder 34 of body 26. The height of the insert is slightly less than the height of shoulder 34. The plate has a central opening 42 sized for the enlarged diameter section 38 of stem 30 to fit through the plate. The diameter of opening 42 is smaller than that of the valve seat for the valve seat to be retained in the cavity formed between valve body 12 and body 26. Adjacent the opposite end of body 26, bore 32 has a reduced diameter section 32a. The diameter of this section of the bore is slightly larger than the uniform diameter portion of valve stem 30. The reduced diameter section of bore 32 creates a wall 44 within body 26. A biasing spring 46 has one end which seats against wall 44. A spring plate 48 fits onto valve stem 30. Plate 48 has a central opening whose diameter generally corresponds to that of the uniform diameter portion of the valve stem for the seat to be mounted on the stem with an interference fit. The other end of spring 46 bears against plate 48 to urge valve seat 28 against edge 24 of the orifice to close the fluid flow path between inlet 14 and outlet 16. A circumferential seal 41 is sandwiched between shoulder 34 of body 26 and valve body 12. Plate 40 has an outer face 43 extending into the cavity or chamber formed between the valve body and body 26. The thickness of the plate increases from the area adjacent opening 42 outwardly toward the outer margin of the plate. Face 43 further includes an annular raised section 45. The inner diameter of this raised section is slightly greater than the diameter of valve seat 28. When the valve seat is opened, as described hereinafter, the outer margin of the valve seat may bear against plate face 43 on the inside of the raised section. A flexible diaphragm 47 is attached by suitable means to plate 40. The diaphragm has a central opening sized for the diaphragm to be mounted on stem 30 on the backside of valve seat 28. The diaphragm has an annular section corresponding in size and shape to the raised portion of plate 40. When seat 28 is in its valve closing position of FIGS. 1 and 3, the diaphragm is drawn away from face 43 of plate 40. However, when the valve seat is moved to the valve opening position, the diaphragm is moved toward the plate. This is the position shown in FIGS. 10 and 11. It is important to note that the diaphragm keeps the fluid media used in the process out of contact with the valve mechanism effecting opening and closing of the valve.

Valve assembly 10 next includes means indicated generally 50 for moving valve stem 30. In FIG. 1, means 50 is shown to comprise a solenoid 52 having a coil 54 and a pole piece 56. Coil 54 is an annular coil having an open central core 58 in which pole piece 56 is disposed for movement. The pole piece has a central section of a uniform diameter with a reduced diameter section 56a, 56b formed at each end of the pole piece. Bore 32 of body 26 has an increased diameter section at the upper end of the body, as viewed in FIG. 1. The upper end of valve stem 30 extends into this portion of the bore. End 30b of stem 30 comprises a reduced diameter section of the valve stem. A central bore 60 is formed in section 56a of pole piece 56 and end 30b of the valve stem is sized to be received in bore 60. When sensor/control unit S determines to open the fluid path between the inlet and outlet, it supplies an appropriate electrical input to coil 54. The resultant electromagnetic field produced is impressed on pole piece 56.

Referring to FIGS. 12A–12C, moving means 50 can include other than a solenoid 52. In FIG. 12A, for example, a moving means 50' comprises a piezoelectric stack 62. Energization of stack 62 produces movement of an armature 64. In FIG. 12B, a moving means 50" includes a dynamoelectric machine 66 which comprises an electric motor. Dynamoelectric machine 66 includes an electrical winding 68 which is energized by an appropriate input from sensor/control unit S. This, in turn, produces movement of an armature 70. Another embodiment 50''' of the moving mean includes use of a magnetorestrictive material 72 for producing movement of an armature 74. In each of these alternate embodiments, the force imposed on the respective armature moves the armature along a lateral axis L which is orthogonal to the central longitudinal axis X of the armature.

A circumferential shoulder 26s is formed on the outer face of body 26. At the upper end of the body, as viewed in FIG. 1, is an annular flange 26f which is formed about the upper end of bore 32. Coil 54 of solenoid 52 has one end which seats against the upper end of body 26 and is held in place by flange 26f. The outer diameter of the coil is equal to, or is slightly less, than the diameter of body 26. An enclosure 75 comprises an open ended canister which fits over the outside of body 26 and rests upon shoulder 26s. The length of the canister is such that it encloses the solenoid coil. An end 75e of the canister adjacent the upper end of coil 54, as viewed in FIG. 1, has a central opening 75c through which end 56b of pole piece 56 extends.

It is an important feature of the present invention that unlike conventional, prior art valves in which energization of a moving means results in a linear displacement of a valve seat with respect to an orifice, valve assembly 10 includes means 76 for translating movement of valve stem 30 into a pivoting or pivotal movement of valve seat 28 about orifice edge 24 to open a fluid flow path between inlet 14 and outlet 16 through the orifice. Means 76 includes a plunger 78 which is seated upon end 56b of armature 56. The plunger is installed in a cap portion 80 of the valve assembly. A cover 82 fits over the cap end of the assembly to enclose the plunger. Plunger 78 has an annular groove 84 adjacent the end of the plunger contacting pole piece 56. Springs 86a, 86b are installed in cap 80 on opposite sides of the plunger. Each spring has an associated seat 88a, 88b for one end of the spring to bear against the seat. The other end of the spring is received in groove 84 to urge the plunger in a direction orthogonal to the longitudinal axis of both stem 30 and pole piece 56. This movement is normally constrained by the other spring. The result is that the springs act to center the plunger. When current is supplied to coil 54, pole piece 56 is constrained from linear or longitudinal movement by the springs. However, the coil current produces a force which draws the plunger sideways as indicated by the arrows. This movement is controlled by respective stops 90a, 90b. As the plunger is drawn to one side or the other, it contacts a respective stop 90.

The stops are mounted in a support 92 which is machined into canister 75. The support has axial openings 94 in which stops 90a, 90b are installed. The stops are each adjustable to control the extent to which plunger 78 can move to one side of the cap. The spring seats 88a, 88b are mounted between end 75e of canister 75 and the underside of support 92. The seats are also adjustable to control the spring forces acting on the plunger. In addition, an adjustment screw 96 is connected to the outer end of plunger 78. Adjusting screw 96 controls the effective length of a lever arm created by the combination of valve stem 30, pole piece 56, and plunger 78.

It will be noted that the springs provide a force which is opposed to the electromagnetic force. By varying the amount of preloading on the springs, the opening point of the valve can be controlled. For different size valves, springs having greater or lesser spring constants can be used. This would alter the relationship between the voltage supplied to the valve and the resulting forces produced. Further, loosening screw 96 allows plunger 78 to be moved to vary the air gap between the plunger face and the canister. Varying this air gap also alters the performance characteristics of the valve. Also, placing spacer plates (not shown) between plunger 78 and armature 56 would adjust the lever arm so as to vary the resolution of the valve.

Referring to FIG. 13, a prior art valve construction includes a valve seat 100 connected to a valve stem 102. A bias spring 104 urges the valve seat against an opening 106. When the valve is actuated, a linear motion of the valve stem along its longitudinal axis (as indicated by the arrows) draws the valve seat away from the orifice against the force of the spring. Depending upon the force of spring 104, the amount of force to required to open the valve can be substantial. When the valve is deactuated, the force of the bias spring returns the valve seat to its closing position.

Referring to FIGS. 10 and 11, the operation of valve assembly 10 is shown in contrast to that described above. In FIGS. 10 and 11, valve assembly 10 is shown with valve seat 28 pivoted against edge 24 of the orifice collar so to be canted or cocked into an open position. The lever arm produced by the combination of valve stem 30, pole piece 56, and plunger 78 results in less force being required to move seat 28 against the force of spring 46 than is required to move seat 100 against the force of spring 104. The pivot valve arrangement of valve assembly 10 causes the actuation forces to be applied perpendicular to the valve seat axis. And, this force is applied at a substantial distance from the valve seat. Adjustment of screw 96 allows this distance to be increased or decreased as is required for a particular application. This is done to achieve a desired force and flow area for a displacement resolution. The resulting mechanical advantage of the above described construction over conventional valve constructions such as shown in FIG. 13 is significant.

In addition to the mechanical advantage obtained by moving the valve seat laterally rather than linearly to open and close the fluid flow path between the inlet and outlet, another significant advantage of the present invention is the degree of resolution between seat 28 movement and the flow area exposed which is obtainable compared with that of conventional valve designs. For example, for a pivot valve 10 having a 3" (7.62 cm.) valve seat extension and a 0.076" (0.19 cm.) diameter orifice 18, deflection of the seat 0.046" (0.12 cm.) produces a $1.43*10^{-4}$ in.$^2$ flow area. A conventionally displaced valve seat having the same flow area must be moved 0.0034" (0.009 cm.). The resulting displacement ratio indicates an improvement of 13 in the resolution; i.e., 0.046/0.0034=13.5.

Figure 4:
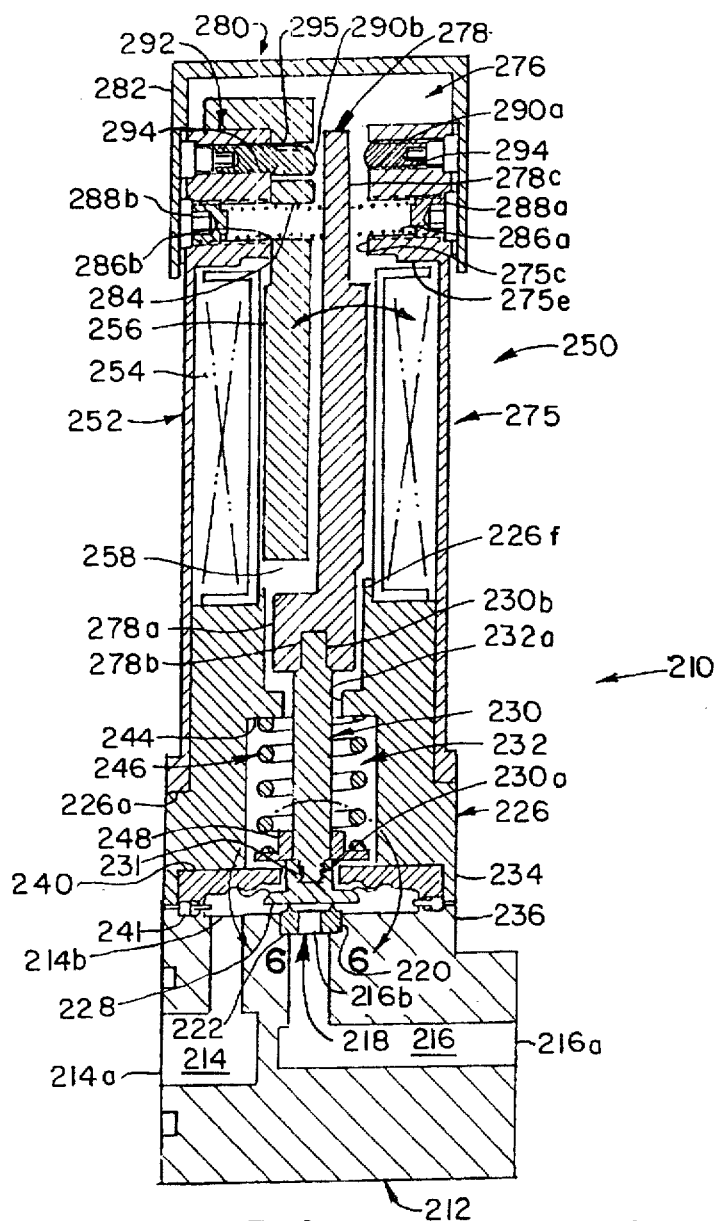
FIG. 4 is an elevational view, in section, of a second embodiment of the pivot valve assembly.
Figure 5:
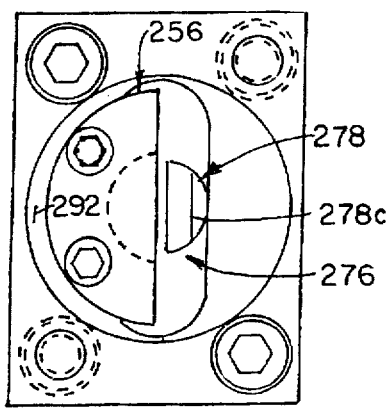
FIG. 5 is a top plan view of the valve assembly of FIG. 4 with an assembly cover removed.
Figure 6:
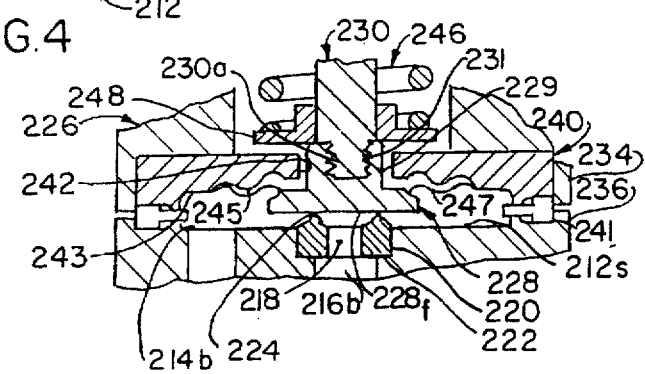
FIG. 6 is a partial sectional view of the valve assembly taken along line 6—6 in FIG. 4.

Referring now to FIGS. 4-6, a second embodiment of the invention is shown. Here, a valve 210 is for use with the fluid flow system S of FIG. 1 in place of the valve 10 previously described. Valve 210 includes a valve body 212 having an inlet 214 and an outlet 216 formed therein. Inlet 214 and outlet 216 are similar to the inlet 14 and outlet 16 previously described with inlet 214 having a port 214a connected to the fluid source and a port 214b opening into a sidewall 212s of the valve body. Outlet 216 has a port 216a opening into a fluid conduit the system and a port 216b formed in sidewall 212s of the valve body. An orifice 218 is formed at port 216b of outlet 216. The orifice comprises an annular collar 220 seated upon a shoulder 222 formed at port 216b. The collar has a base resting upon shoulder 222 and extending above sidewall 212s of the valve body. The outer face of the collar is pointed or rounded, as indicated at 224 to define an edge for seating a valve seat.

A body 226 supports a valve seat 228 mounted in the body for opening and closing movements relative to orifice 218. The valve seat comprises a plate having a diameter exceeding that of orifice 218. A face 228f of valve seat 228 seats upon edge 224 to close the orifice. The valve seat has an associated valve stem 230 which has respective first and second ends 230a, 230b. On the opposite side of face 228f, the valve seat has a boss 229 in which is formed a threaded bore 231. End 230a forms a threaded post sized to be threaded into bore 231 to attach the valve seat to the stem. Body 226 includes a longitudinal, central bore 232 extending the length of the body. A circumferential shoulder 234 is formed at one end of body 226. Valve body 212 has a corresponding shoulder 236. The shoulders abut one another when valve 210 is assembled.

Valve stem 230 has a central section of uniform diameter. A plate 240 is sized to fit into cavity or chamber defined by shoulder 234, and the height of the plate is slightly less than that of the shoulder. The plate has a central bore 242 sized for boss 229 of the valve seat to move back and forth through the opening. However, the diameter of the opening is smaller than that of the valve seat. At the opposite end of body 226, bore 232 has a reduced diameter section 232a whose diameter is slightly larger than that of the uniform diameter portion of valve stem 230. This reduced diameter portion of bore 232 forms a wall 244 in body 226. One end of a biasing spring 246 seats against wall 244. A spring plate 248 is sized to fit onto valve stem 230. The spring plate has a central opening corresponding in size to the diameter of the valve stem for the plate to be received on the stem. Plate 248 seats on the valve stem by an interference fit. One end of spring 246 bears against the plate to urge the valve seat against edge 224 of orifice 218; this to close the flow path between inlet 214 and outlet 216.

A seal 241 is captured between shoulder 234 of body 226 and the valve body. Plate 240 has an outer face 243 whose thickness increases from opening 242 outwardly toward the outer margin of the plate. The face has an annular raised section 245 whose inner diameter is greater than the diameter of valve seat 228. A flexible diaphragm 247 is attached by suitable means to plate 240. The diaphragm is installed over stem 230 and has an opening which allows an inner margin of the diaphragm to seat upon the backside of valve seat 228. The diaphragm has circular raised portion which matingly fits over the raised portion of plate 240. When seat 228 closes orifice 218, diaphragm 247 is pulled away from face 243 of plate 240. When seat 228 is pivoted in a direction to uncover the orifice, the diaphragm is moved toward plate 240.

Valve assembly 210 includes a moving means 250 for moving valve stem 230. As shown in FIG. 4, means 250 comprises a solenoid 252 having a coil 254 and a pole piece 256. Coil 254 is an annular coil having a central opening 258 in which pole piece 256 is disposed. The pole piece comprises an elongate L-shaped pole piece which is installed in an inverted configuration in FIG. 4 so the main arm of the pole piece is disposed in opening 258. As with the solenoid of valve assembly 10, when a sensor/control unit determines to open the fluid path between valve's the inlet and outlet, an appropriate electrical input coil is supplied to coil 254. Also, it will be understood that the alternate constructions of moving means 50'—50''' (see FIGS. 12A–12C) could be employed in valve 210.

Bore 232 has an increased diameter section at the upper end of body 226. The upper end of valve stem 230 extends into this portion of the bore. End 230b of the valve stem is a reduced diameter section of the valve stem. A circumferential shoulder 226a is formed on the outer face of body 226, and at the upper end of the body is an annular flange 226f. Coil 254 has one end seating against the upper end of body 226. An open ended canister 275 fits over the outside of body 226 with the open end resting against shoulder 226a. The canister encloses coil 254. An end 275e of the canister has a central opening 275c through which the pole piece extends.

As with valve assembly 10, it is an important feature of valve 210 that rather than a linear motion of the pole piece being produced when coil 254 is energized, there is instead a lateral motion applied to valve seat 230 to move the seat relative to orifice 218 and open the fluid path between the valve inlet and outlet. For this purpose, valve 210 includes a means 276 for translating movement of valve stem 230 into a pivoting movement of the valve seat about orifice edge 224 to open the fluid flow path through the orifice. Means 276 includes a plunger 278 which is installed in the valve assembly so to extend parallel to the pole piece through central opening 258 of coil 254. As shown in FIG. 5, both pole piece 256 and plunger 278 are semi-circular when viewed in plan. When the valve is assembled, the pole piece is installed so to be positioned to one side of the longitudinal axis of the valve with plunger 278 extending parallel thereto on the other side of the axis. The length plunger 278 extends through the valve assembly is greater than that of the pole piece. At its base, the plunger has an enlarged diameter section 278a. The diameter of this plunger section is such that it is concentric with the upper portion of bore 232 in valve body 226. Plunger section 278a has an opening 278b sized to receive the upper end 230b of valve stem 230.

The upper end 278c of plunger 278 is installed in a cap end 280 of the valve assembly. A cover 282 is installed fits over the cap to enclose the plunger. Pole piece 256 has a first transverse opening 284 at its upper end. A springs 286b extends through opening 284 to contact one side of plunger 278. A second spring 286a bears against the opposite side of the plunger. Each spring has an associated seat 288a, 288b. The springs urge plunger 278 in a direction orthogonal to the longitudinal axis of stem 230 and pole piece 256. Any lateral movement of the plunger is constrained by the force of the respective springs which act to center the plunger. As before, when current is supplied coil 254, the coil current produces a force which draws the plunger sideways as indicated by the arrows. Movement of plunger 278 is limited by respective stops 290a, 290b. The stops, together with the springs, are installed in a support 292 that is mounted in cap 280. The base of pole piece 256 fits over the upper end of support 292 when the valve is assembled. Support 292 has axial openings 294 in which the stops are fitted. Pole piece 256 has a second transverse opening 295 through which stop 290b extends. This second transverse opening also extends completely through the pole piece for the inner end of the stop to be contacted by the plunger. Both stops are adjustable to limit the extent plunger 278 can move to one side of cap 280. The spring seats 288a, 288b are mounted between end 275e of canister 275 and the base of support 292. These seats are also adjustable to control the spring forces acting on plunger 278.

Operation of valve assembly 210, when an input is supplied to coil 254 is similar to that of valve 10 as shown in FIGS. 10 and 11. That is, valve seat 228 pivots on edge 224 of orifice 218 so to be canted or pivoted into an open position. The lever arm produced by the combination of valve stem 230, and plunger 278 allows valve seat 228 to be moved to the valve opening position with less force being required to move the seat against the force of spring 246 than would be required to move the seat 100 in the conventional against the force of the spring normally forcing the valve closed. Again, the pivot valve arrangement of the invention allows actuation forces to be applied perpendicular to the axis of the valve seat; these forces being applied substantially distant from the valve seat. Also as before, besides the mechanical advantage achieved, a greater degree of resolution is again obtained. As noted, this resolution is on the order of thirteen times greater than what is obtained in a conventional valve.

Figure 7:
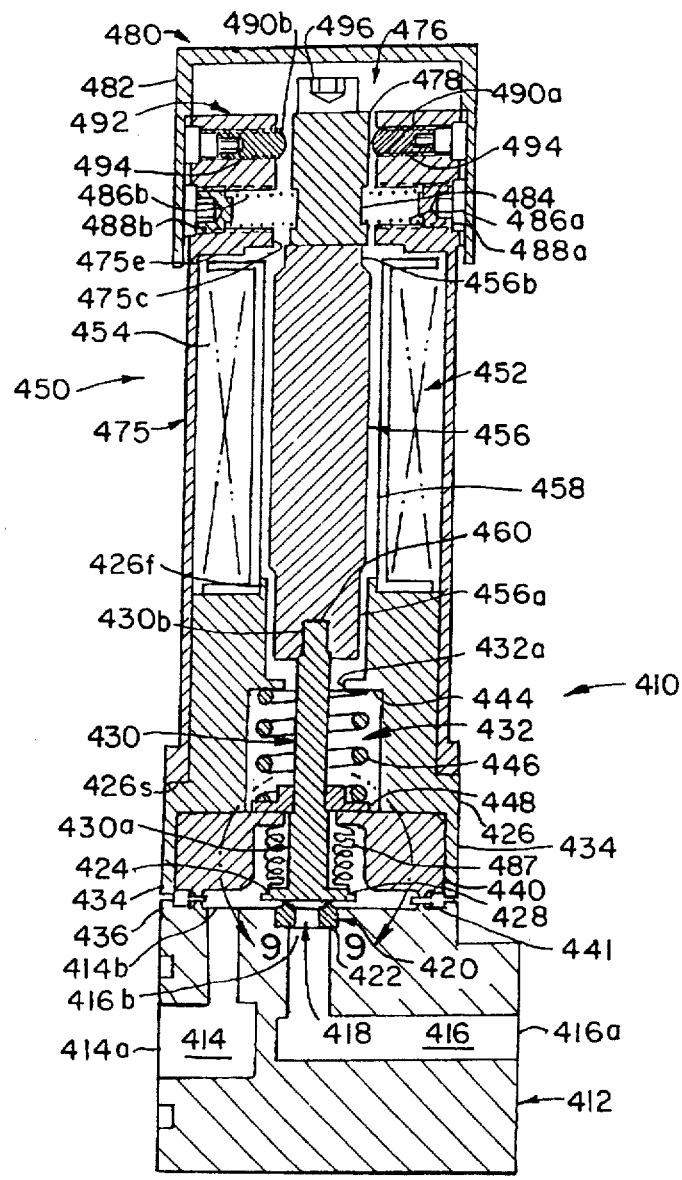
FIG. 7 is an elevational view, in section, of a third embodiment of the pivot valve assembly.
Figure 8:
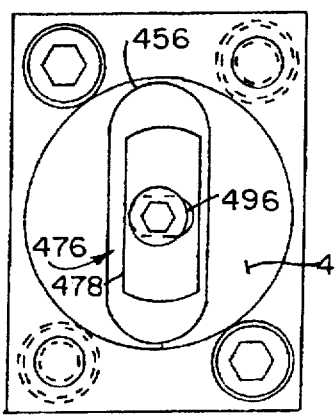
FIG. 8 is a top plan view of the valve assembly of FIG. 7 with an assembly cover removed.
Figure 9:
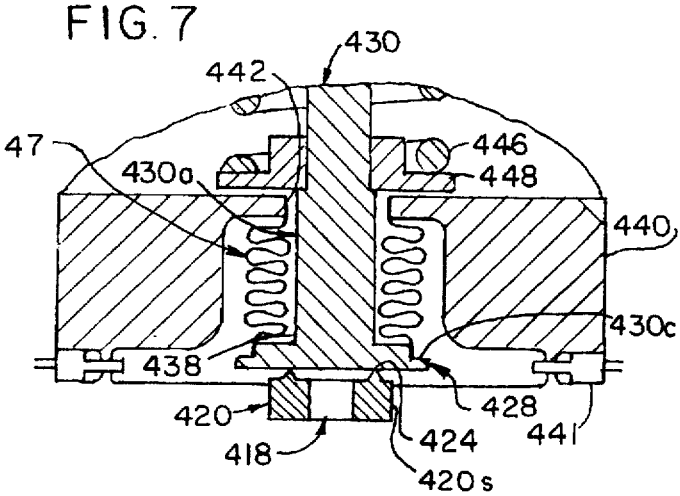
FIG. 9 is a sectional view of the valve assembly taken along line 9—9 in FIG. 7.

A third embodiment of the present invention is shown in FIGS. 7–9 and is indicated generally 410. A valve assembly 410 first includes a valve body 412 of a suitable material. An inlet 414 and outlet 416 are formed in the valve body. Both inlet 414 and outlet 416 comprise L-shaped passages with each passage having a first port 414a, 416a and a second port 414b, 416b respectively. An orifice 418 interposed between the inlet and outlet comprises a circumferential collar 420 seated upon an annular shoulder 422 formed at port 416b. The collar includes a base resting upon shoulder 422 and extending above a sidewall 412s of the valve body. The upper portion of the collar is pointed or radiused, as indicated at 424, to define an edge for seating a valve seat.

Figure 2:
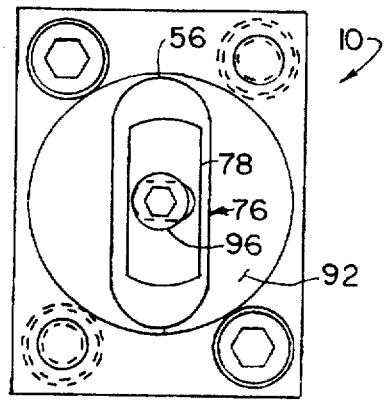
FIG. 2 is a top plan view of the valve assembly with an assembly cover removed.

A body 426 helps support and position a valve seat 428 installed in the body for movement relative of the valve seat relative to orifice 418. Valve seat 428 is a circular plate having a diameter greater than that of the orifice. The valve seat is pivotally moved between a valve closing position and a valve opening position. The valve seat has an associated stem 430. The valve stem has respective ends 430a, 430b. As with the embodiment of FIGS. 1–3, valve seat 428 is integrally formed with end 430a of the valve stem. Body 426 includes a longitudinal, central bore 432 extending the length of the body. Body 426 also has a circumferential shoulder 434 formed at one end. Valve body 412 has a corresponding circumferential shoulder 436 which abuts shoulder 434. The central portion of the valve stem is of a uniform diameter. Because valve seat 428 is integrally formed with the valve stem at end 430a of the stem, this end of the stem has an enlarged diameter section 438. Valve seat 428 is formed at the outer end of this enlarged diameter.

An insert 440 has an outer diameter sized for the plate to fit into the cavity defined by shoulder 434. The height of the plate corresponds to the height of the shoulder. Insert 440 has a central opening 442 in which the enlarged diameter section 438 of valve stem 430 fits. At the opposite end of body 426 is a reduced diameter section 432a of bore 432, the diameter of this bore section being slightly larger than the uniform diameter portion of valve stem 430. A wall 444 is created at the transition in the bore diameter. One end of a biasing spring 446 seats against wall 444. A spring plate 448 has an interference fit with valve stem 430. The other end of spring 446 bears against this plate to urge valve seat 428 against edge 424 of the orifice. In this position, the fluid flow path between inlet 414 and outlet 416 is closed. A circumferential seal 441 is pressed between shoulder 434 of body 426 and the valve body. A bellows 447 has one end suitably attached to surface 430c on valve stem 430 and its other end suitably attached to surface 442 of plate 440. The bellows extends the length of valve stem section 430a with the other end of the bellows fitting about valve seat 428. When the valve seat is pivoted to its position opening orifice 418, the bellows flexes in the appropriate direction.

A moving means 450 for moving valve stem 430 includes a solenoid 452 having a coil 454 and movable pole piece 456. As in the previous embodiments, coil 454 is an annular coil having a central opening 458 in which the pole piece is disposed for movement. The pole piece has a central section of a uniform diameter with reduced diameter sections 456a, 456b at respective ends of the pole piece. Bore 432 has an increased diameter section at the upper end of body 426, as viewed in FIG. 7. The upper end 430b of the valve stem extends into this end of the bore and forms a reduced diameter section of the valve stem. An opening 460 is formed in section 456a of the pole piece. End 430b of the valve stem is received in this opening. As before, when an appropriate electrical input is supplied to coil 454, the resultant electromagnetic field produces movement of the pole piece. A circumferential shoulder 426s is formed on the outer face of body 426, and an annular flange 426f at the upper end of the body. One end of coil 454 seats against the upper end of body 426 and is held in place by flange 426f. A canister 475 is an open ended canister which fits over body 426 with the open end of the canister resting upon shoulder 426s. The canister fits over solenoid coil 454. End 475e of the canister has a central opening 475c through which end 456b of the pole piece extends. Again it will be understood that the alternate forms of moving means described in FIGS. 12A–12C could be used in place of the means 450 as described.

Valve assembly 410 includes means 476 for translating movement of valve stem 430 into a pivoting movement of valve seat 428 about orifice edge 424 to open the fluid flow path between inlet 414 and outlet 416 through the orifice. Means 476 includes a plunger 478 which seats upon end 456b of the pole piece. Plunger 478 is installed in a cap 480 of the valve assembly and includes a cover 482 which fits over the cap end of the assembly enclosing the plunger. The plunger includes an annular groove 484 formed adjacent the lower end of the plunger. Springs 486a, 486b are mounted in cap 480 on opposite sides of the plunger. Each spring includes a seat 488a, 488b respectively, for one end of the spring to bear against the seat. The other end of each spring fits in groove 484 to bias plunger 478 in a direction orthogonal to the longitudinal axis of both stem 430 and pole piece 456. This movement is normally constrained by the other spring. As a result, the springs act to center the plunger. When current is supplied to coil 454, pole piece 456 is constrained from a linear or longitudinal movement by springs 486a, 486b. Consequently, the force produced by the resultant electromagnetic field causes plunger 478 to move laterally rather than linearly. And, this lateral movement is controlled by respective plunger stops 490a, 490b. When the plunger moves to one side or the other, it contacts one of the respective stops.

The stops 490a, 490b are installed in a support 492 which is installed in cap 480. This support has respective axial openings 494 in which the stops are installed. Each stop is separately adjustable to control the extent to which plunger 478 can move from side to side. The respective spring seats 488a, 488b are mounted between end 475e of canister 475, and the underside of support 492. The position of the seats within the support are also adjustable to control the spring forces acting on plunger 478. An adjustment screw 496 connects to the outer end of the plunger. The adjusting screw allows the effective length of the lever arm created by valve stem 430, pole piece 456, and plunger 478 to be adjusted.

The foregoing described embodiments of the invention are useful in industrial applications where, in addition to the greater resolution achievable than with conventional valves, the selection of appropriate materials for valve seat and orifice will also reduce wear. These materials include soft metals, plastics, and elastomeric materials. There are, however, applications for the pivot valve in the semiconductor industry which has extremely stringent requirements concerning cleanliness and particle generation due to wear. The use of the aforementioned materials is not acceptable in the semiconductor industry. In this industry, wetted materials must be made of a corrosion resistant material such as 316L V.A.R. For the valve construction described in the foregoing embodiments, there is a possibility that operation of the valve may produce sub-micron particles. The semiconductor industry does not accept valves where particles greater in size than 0.01 microns may be generated.

Referring to FIGS. 14–16, a fourth embodiment of the invention is shown which addresses the problems specific to the semiconductor industry and provides a pivot valve assembly usable in manufacturing semiconductor components. In this embodiment, a valve assembly 610 includes a valve body 612 of a suitable metal or plastic material. An inlet 614 and an outlet 616 are formed in the body. The L-shaped passage comprising inlet 614 has a port 614a connecting with the fluid source, and a port 614b opening into a sidewall 612s of the valve body. The L-shaped passage comprising outlet 616 has a port 616a opening into the fluid conduit, and a port 616b also formed in sidewall 612s. Ports 614b and 616b are spaced from one another, and an orifice 618 interposed between the inlet and outlet is formed at port 616b. A circumferential collar 620 forms a raised surface or shoulder about orifice 618 and extending slightly above sidewall 612s of the valve body. The outer end of the collar is a flat lapped surface, as indicated at 624, to form an edge.

The valve assembly has a body 626 in which is mounted a valve seat 628 for movement relative to orifice 618. Seat 628 is formed by a circular plate whose diameter is greater than that of orifice 618. In a first and valve closing position, a face 628f of the valve seats on edge 624; and in a second and valve opening position, the valve is dram away from the edge. The valve seat has an integrally formed valve stem 630. The valve stem has a circumferential shoulder 630s formed adjacent the valve seat. The remainder of the valve stem is of uniform diameter. At the end of the stem opposite the valve seat, a pocket or an indentation 631 is formed for supporting a ball 633. The ball has a diameter smaller than that of the valve stem, and indentation 631 is centrally formed in the end of the stem.

Body 626 a longitudinally extending central bore 632 formed at one end and a circumferential shoulder 634 formed at its end adjacent valve body 612. Valve 612 has an abutting circumferential shoulder 636. A plate 640 is of a diameter such that the plate fits into the chamber defined by shoulder 634 and side 612s of the valve body. The plate has a central opening 642 sized for valve stem 630 to fit through the plate. The diameter of the opening is less than that of valve seat 630 so the valve seat is retained in the cavity formed by the valve body and body 626. Bore 632 has a reduced diameter section 632a, the diameter of this bore section being larger than valve stem 630 and defining a wall 644 in body 626. A biasing spring 646 has one end seating against wall 644.

A hollow, cylindrical sleeve 648 extends substantially the length of the chamber created by wall 644 and plate 640. The end of sleeve 648 adjacent plate 640 has an enlarged diameter, flattened section 648a. The underside of section 648a includes a circumferential, raised, semicircular shoulder 648b which abuts against the backside 640b of plate 640. The outer surface of sleeve 648 is of uniform diameter and spring 646 is sized to fit about the sleeve with the other end of the spring bearing against sleeve section 648a to urge the sleeve against plate 640. As shown in FIG. 14, the inner diameter of the sleeve is stepped such that there is a first diameter section 648c at the end of the sleeve adjacent plate 640. Next, there is an enlarged diameter section 648d, and then a further enlarged diameter section 648e. A post 649 has a lower section 649a whose diameter corresponds to that of sleeve section 648c, for this end of the post to be received in section 648c. The outer face 649f of the post is in contact with ball 633. At the opposite end of the post is an enlarged diameter section 649b one end of which rests upon the shoulder formed at the juncture between sleeve sections 648d and 648e. A spring 651 has one end bearing against a face of post section 649b and the other end against the shoulder formed at the juncture between sleeve sections 648c and 648d. Spring 651 urges post 649 in the opposite direction to that in which spring 646 urges sleeve 648. As post 649 is screwed in surface 649f contacts the ball 633 and forces surface 628f on valve seat 628 to contact edge 624 which will close the valve. Spring 651 supports post 649 to prevent back lash in threads while adjustment is made.

A circumferential seal 641 is captured between shoulder 634 of body 626 and the valve body 612. Plate 640 has a stepped outer face 643 extending into the cavity formed between the valve body and body 626. There is a step increase in the thickness of the plate for the plate to increase in thickness from the area adjacent a central opening 642 in the plate outwardly toward the outer margin of the plate. A flexible diaphragm 647 is attached to plate 640 by suitable means. The diaphragm has a central opening sized for the diaphragm to fit about valve stem 630 on the backside of the valve seat and is attached to stem 630 by suitable means. The central portion of the diaphragm is corrugated so to provide room for flexure of the diaphragm when valve seat 628 is moved axially off of edge 624.

Valve assembly 610 further includes moving means indicated generally 650 for effecting the opening and closing of the valve. Means 650 includes a solenoid 652 having an annular coil 654 and pole piece 656. Coil 654 has an open central core 658 in which the pole piece moves. Pole piece 656 has a central section of uniform diameter and reduced diameter sections 656a, 656b formed at the respective ends of the pole piece. Bore 632 has an increased diameter section 632b at the upper end of body 626. End 656a of the pole piece extends through this portion of the body, through reduced diameter section 632a of the bore, and into an open end of sleeve 648. Again as before, when sensor/control unit S determines to open the fluid path between the inlet and outlet, it supplies an appropriate electrical input to coil 654 with the resultant electromagnetic field being impressed on pole piece 656.

A circumferential shoulder 626s is formed on the outer face of body 626. At the opposite end of the body is an annular flange 626f which extends about the upper end of bore 632. Coil 654 has one end seating against the upper end of body 626 and held in place by flange 626f. A canister 675 is an open ended canister fitting about the outside of body 626 and resting on shoulder 626s. End 675e of the canister has a central opening 675c through which end 656b of the pole piece extends.

Valve assembly 610 next includes means 676 for translating movement of valve stem 630 into the axial movement of valve seat 628 off of edge 624, thus opening the fluid flow path between the valve inlet and outlet through the orifice. Means 676 comprises a plunger 678 which seats upon end 656b of the pole piece. The plunger fits into a cap 680 of the valve assembly which has a cover 682 that encloses the plunger. The plunger includes an annular groove 684 adjacent the end of the plunger contacting the pole piece. Springs 686a, 686b are installed in the cap on opposite sides of the plunger. Each spring has an associated seat 688a, 688b for one end of the spring to bear against the seat. The other end of the spring is received in the groove and urges the plunger in a direction orthogonal to the longitudinal axis of the valve and pole piece 656. Because, as previously described, this movement is constrained by the other spring, the current supplied to the coil produces a force moving the plunger laterally, this movement being controlled by respective stops 690a, 690b mounted in a support 692. The stops are installed in openings 694 in the support and are each adjustable to control the extent to which the plunger can move. An adjustment screw 696 is connected to the outer end of the plunger varies the effective length of a lever arm created by the valve stem, pole piece, and plunger.

The importance of the construction of valve assembly 610 is that the pivoting member of the valve has now been moved outside the flow stream between inlet 614 and outlet 616 through orifice 618. That is, sleeve 648, post 649, and ball 633 now comprise the pivoting members, with valve member 628 moving in an axial direction similar to conventional valves. When a current is supplied to coil 654, the lever comprising plunger 678, pole piece 656, sleeve 648, and post 649 is moved along an arc. Face 649f of the post is a flat face. Accordingly, when the lever arm moves, sleeve 648 will then pivot about a point between surface 648b and surface 640b. In turn, surface 649f on post 649 moves along an arc which will cause ball 633 to move in an axial direction toward post 649. During this movement, contact is maintained between ball 633 and post 649 by the upward force exerted by diaphragm 647. As the ball moves, the valve member 628 will move away from edge 624. This opens the valve. The degree of opening is a function of how far the lever arm is moved. This, in turn, is a function of the amount of current supplied to the coil. When current flow ceases, the lever returns to its original position with the valve member 628 contacting the orifice edge 624.

The wetted materials used in the valve assembly are now all made of a corrosion resistant material such as 316L V.A.R. An advantage with construction for use in the semiconductor industry is that while valve member 628 is lifted valve seat 624 in a more conventional manner, there is no physical contact between the valve member and seat, except at closure. This now eliminates the possible generation of sub-micron particles which could contaminate the semiconductor manufacturing process. The result is a cleaner manufacturing process. In addition, the ball and valve member construction of this embodiment provides an ability to vary the pivoting angle versus the vertical movement of the ball. This directly effects valve resolution. Also, there is an improved valve shutoff capability provided by this construction.

Finally, referring to FIGS. 17 and 18, an alternate construction for imparting a lateral force to the lever arm is shown. This embodiment, indicated generally 810 includes a moving means 850 comprising a solenoid 852. This solenoid is laterally mounted with respect to a valve canister 875 that attaches to body 826 of the valve assembly. The solenoid includes a coil 854 and plunger 856. A bracket 878 is an L-shaped bracket the lower end of which attaches to a valve stem 830. A valve member (not shown) is attached to the valve stem and biased closed by spring 846. The plunger 856 has a hub 902 by which the center portion of the bracket 878 is attached to the plunger 856 for movement therewith. The solenoid has a pole piece 904 having a flange 906 at one end thereof. A shell 908 for the solenoid comprises a canister open at one end for seating against flange 906. The outer surface of the shell is stepped, as indicated at 910 for a reduced diameter portion of the shell to fit into an appropriately sized opening 912 formed in the sidewall of canister 875. The closed end of the shell has a central opening 914 through which the plunger is reciprocally movable. Pole piece 904 has a central bore 916 which is stepped in diameter along its length as indicated at 918 and 920. A positioner 922 is adjustable within the threaded bore for an end of the positioner to project into a cavity 924 through which the plunger is reciprocally movable. The adjustment of the positioner controls the degree of movement of the plunger and hence the amount of lateral movement of the plunger. Adjustment of the positioner is against a bias spring 926 which seats against a shoulder formed at step 920 within the bore.

In FIGS. 19–21, a fifth embodiment of the invention employs a bellows 1047 rather than a diaphragm 647 such as shown in FIGS. 14–16. A valve assembly 1010 has a valve body 1012 with an inlet 1014 and an outlet 1016 formed in the body. Inlet 1014 has a port 1014a connecting with a fluid source, and a port 1014b opening into a sidewall 1012s of the valve body. The L-shaped passage comprising outlet 1016 has a port 1016a opening into the fluid conduit, and a port 1016b also formed in sidewall 1012s. Ports 1014b and 1016b are spaced from one another with an orifice 1018 interposed between the inlet and outlet formed at port 1016b. A collar 1020 forms a shoulder about the orifice and extends slightly above sidewall 1012s of the valve body. The outer end of the collar forms an edge 1024.

Valve assembly 1010 has a body 1026 in which is mounted a valve seat 1028 for movement relative to orifice 1018. Seat 1028 forms a circular plate whose diameter exceeds that of orifice 1018. When the valve is closed, a face 1028f of the valve seats on edge 1024. When the valve is open, the valve is drawn away from the edge. The valve seat has an integrally formed valve stem 1030 with a circumferential shoulder 1030s formed adjacent the valve seat. The remainder of the valve stem is of uniform diameter. The end of the stem opposite the valve seat includes a centrally formed pocket 1031 for supporting a ball 1033 whose diameter is smaller than that of the valve stem.

Body 1026 has a longitudinally extending central bore 1032 formed at one end and a circumferential shoulder 1034 formed at its end adjacent valve body 1012. The valve has an abutting circumferential shoulder 1036. A plate 1040 has a diameter such that the plate fits into the chamber defined by shoulder 1034 and side 1012s of the valve body. Stem 1030 fits through a central opening 1042 in the plate. The diameter of the opening is less than that the of valve seat, and the valve seat is retained in the cavity formed by the valve body and body 1026. Bore 1032 has a reduced diameter section 1032a. This diameter is greater than that of valve stem 1030 and defines a wall 1044 in body 1026. A biasing spring 1046 has one end seating against this wall.

A hollow, cylindrical sleeve 1048 extends substantially the length of the chamber created by wall 1044 and plate 1040. The end of sleeve 1048 adjacent plate 1040 is an enlarged diameter, flattened section 1048a the underside of which includes a circumferential, raised, semicircular shoulder 1048b abutting against backside 1040b of plate 1040. The outer surface of sleeve 1048 is of uniform diameter and spring 1046 fits about the sleeve. The other end of the spring bears against sleeve section 1048a urging the sleeve against plate 1040. The inner diameter of sleeve 1048 is stepped and has a first diameter section 1048c at the end of the sleeve adjacent plate 1040, an adjacent enlarged diameter section 1048d, and a further enlarged diameter section 1048e. A post 1049 has a section 1049a whose diameter corresponds to that of sleeve section 1048c, this end of the post being received in section 1048c. An outer face 1049f of the post contacts ball 1033. The opposite end of the post forms an enlarged diameter section 1049b which rests upon the shoulder formed at the juncture between sleeve sections 1048d and 1048e. One end of a spring 1051 seats against a face of post section 1049b, and the other end seats against a shoulder formed at the juncture between sleeve sections 1048c and 1048d. The spring urges post 1049 in the opposite direction to that in which spring 1046 urges sleeve 1048. A surface 1049f of the post contacts ball 1033 forcing surface 1028f of valve seat 1028 to contact edge 1024 closing the valve. Spring 1051 supports post 1049 preventing backlash.

A seal 1041 fits between shoulder 1034 and valve body 1012. Plate 1040 has a stepped outer face 1043, there being a step increase in the plate thickness from the area adjacent a central opening 1042 in the plate outwardly toward the outer margin of the plate. A bellows 1047 (see FIGS. 19 and 21) fits between seat 1028 and plate 1040. The function of the bellows is similar to that performed by diaphragm 647 in the previously described embodiment, with movements of the bellows occurring when valve seat 1028 moves axially off of edge 1024.

A moving means 1050 effects opening and closing of the valve and includes a solenoid 1052 having an annular coil 1054 and pole piece 1056. The coil has a central core 1058 in which the pole piece moves, the pole piece having a uniform diameter mid-section, and reduced diameter end sections 1056a, 1056b. Bore 1032 has an increased diameter section 1032b at the upper end of body 1026, and end section 1056a extends through this portion of the body, section 1032a of the bore, and into an open end of sleeve 1048. When an appropriate electrical input is supplied to the coil, the resultant electromagnetic field is impressed on the pole piece. A circumferential shoulder 1026s is formed on the outer face of body 1026. At the opposite end of the body is an annular flange 1026f extending about the upper end of bore 1032. The coil has one end seating against the upper end of body 1026. A canister 1075 is open ended, fits about the outside of body 1026, and rests on shoulder 1026s. End 1075e of the canister has a central opening 1075c through which end 1056b of the pole piece extends.

A means 1076 translates movement of valve stem 1030 into the axial movement of the valve seat off of edge 1024. This opens the fluid path between the valve inlet and outlet. This means includes a plunger 1078 which seats upon end 1056b of the pole piece. The plunger fits into a cap 1080 of the valve assembly which has a cover 1082 enclosing the plunger. An annular groove 1084 formed in the plunger contacts the pole piece. Springs 1086a and 1086b fit in the cap on opposite sides of the plunger and each spring has an associated seat 1088a, 1088b. One end of the springs fits in the groove 1084 urging the plunger orthogonally of the longitudinal axis of the valve and pole piece 1056. Current supplied to the coil generates a force moving the plunger laterally, this movement being controlled by respective stops 1090a, 1090b mounted in a support 1092. The stops are received in openings 1094 and are adjustable to control the extent to which the plunger can move. An adjustment screw 1096 of the plunger varies the effective length of a lever arm created by the valve stem, pole piece, and plunger.

In FIGS. 22 and 23, a valve construction indicated generally 1110 includes a moving means 1150 including a solenoid 1152. The solenoid is mounted laterally with respect to a valve canister 1175 which attaches to a valve body 1126. The solenoid includes a coil 1154 and plunger 1156. An L-shaped bracket 1178 has a lower end attached to a valve stem 1130. A valve member (not shown) attaches to the valve stem and is biased closed by a spring 1146. Plunger 1156 has a hub 1202 for attaching bracket 1178 to plunger 1156 for movement therewith. The solenoid has a pole piece 1204 with a flange 1206 at one end. A shell 1208 for the solenoid includes an open ended canister which seats against flange 1206. The shell has a stepped outer surface 1210 for a reduced diameter portion of the shell to fit into an opening 1212 in the canister sidewall. The closed end of the shell has a central opening 1214 in which the plunger reciprocally moves. The pole piece has a central bore 1216 stepped in diameter along its length as indicated at 1218 and 1220. A positioner 1222 is adjustable within the threaded bore and projects into a cavity 1224 through which the plunger reciprocally moves. Adjustment of the positioner controls the degree of movement of the plunger and the amount of its lateral movement. Positioner adjustment is made against a bias spring 1226 which seats against a shoulder formed at step 1220 within the bore.

Figure 24:
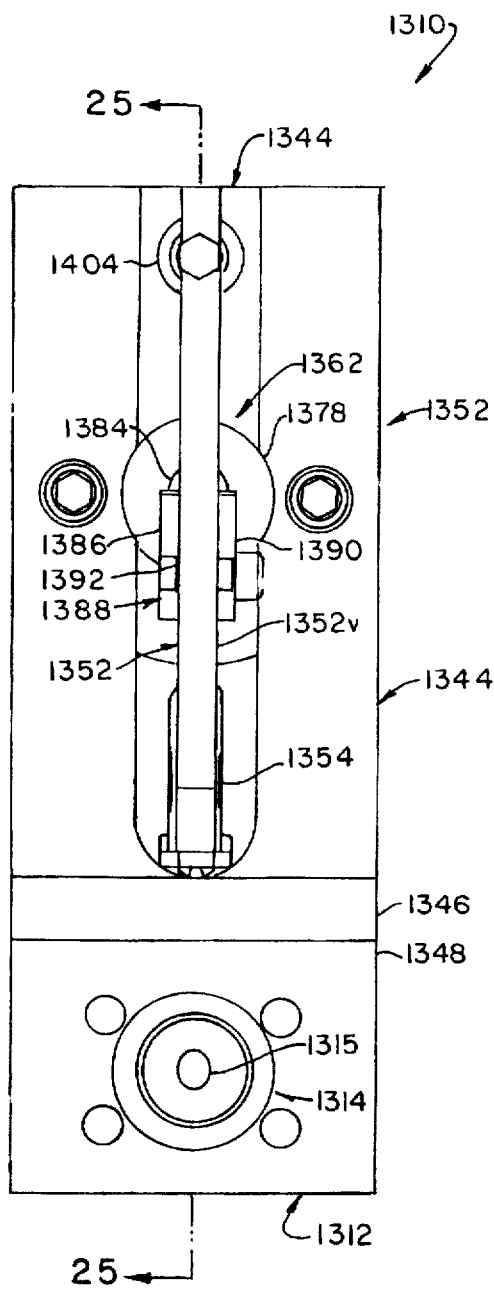
FIG. 24 is an elevational view of a sixth embodiment of the pivot valve assembly; and, FIG. 25 is a sectional view of the pivot valve assembly taken along line 25—25 in FIG. 24.
Figure 25:
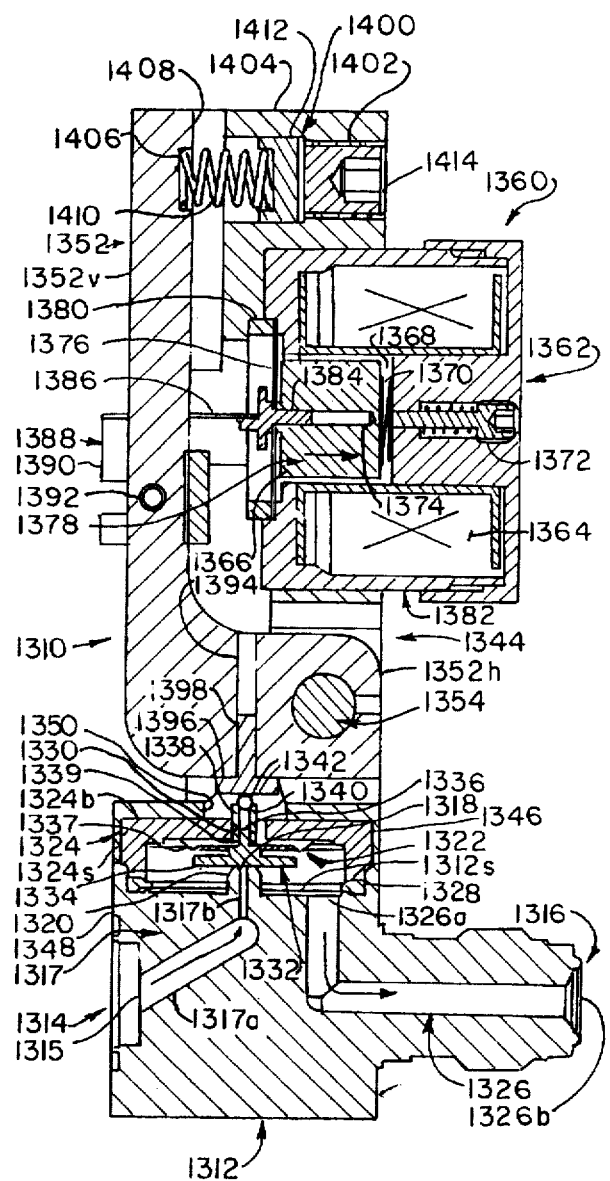

Referring to FIGS. 24 and 25, another alternate embodiment of the invention includes a valve assembly indicated generally 1310. The assembly has a valve body 1312 with an inlet 1314 and an outlet 1316 formed therein. Inlet 1314 includes a port 1315 which connects to a fluid source. A fluid passage 1317 extends inwardly into body 1312 from the inlet port, the passage having a first section 1317a extending diagonally upwardly into the body, and a second and vertical section 1317b which terminates at aport 1318 opening into a sidewall 1312s of the valve body. As shown in FIG. 25, sidewall 1312s forms an upper surface of the valve body. A raised orifice 1320 projects upwardly from the valve sidewall into a fluid chamber 1322 defined by the sidewall, and by a cap piece 1324 which fits over the upper end of the valve body. The vertical section 1317b of fluid passage 1317 has an inlet 1327b formed in sidewall 1312s, and extending through the raised orifice section of sidewall 1312s. Outlet 1316 includes has a L-shaped fluid passage 1326 having an inlet 1326a opening into the fluid chamber, and an outlet 1326b.

As shown in FIG. 25, valve 1310 includes the cap piece 1324 which has a base 1324b and a circumferential depending sidewall 1324s. A seal 1328 is captured between the lower end of the sidewall and a mating surface of body sidewall 1312s. A central opening 1330 is formed in base 1324b of the cap. A valve member 1332 is retained in chamber 1322, the valve seating upon raised orifice 1320 so to block and uncover orifice 1318 as the valve is pivotally moved into and out of contact with the orifice. The valve includes a valve seat 1334 which comprises a plate whose size is greater than that of the orifice. The valve also has an integrally formed valve stem 1336. A collar 1338 fits about the stem and projects upwardly through opening 1330. The outer end of the collar includes a pocket 1340 for supporting a ball 1342 whose movement produces an axial movement of the valve to open and close the fluid passage through the assembly. A diaphragm 1337 has an opening 1339 through which valve stem 1336 extends. The outer margin of the diaphragm is sealingly fitted to the upper wall of cap piece 1324. The diaphragm urges the valve member against orifice 1318, but the diaphragm is also flexibly movable with valve member 1332 as the valve member moves axially to open and close the fluid passage through the valve assembly. At the same time, the diaphragm seals fluid chamber 1322 from the remainder of the valve assembly.

The valve assembly next includes a frame indicated generally 1344. The frame has a base 1346 which fits over valve body 1312. That is, the base is sized to fit over cap piece 1324 and completely encloses the cap piece. Valve body 1312 has a circumferential flange 1348 formed about the upper sidewall 1312s of the body. The depending sidewall 1324s of the cap piece is received within this flange. The lower end of base 1346 abuts the upper end of flange 1348 for the cap piece to be enclosed within the upper end of the valve body and lower end of the frame, when the valve 1310 is assembled. Base 1346 further includes a central opening 1350 into which collar 1338 extends. Ball 1342, as noted, fits into this end of the collar.

A lever arm assembly 1352 is pivotally mounted to frame 1344, as indicated at 1354, for pivotal movement relative to the valve body. Pivot 1354 comprises, for example a frictionless bearing such as a FREE-FLEX® pivot frictionless, friction free bearing manufactured by the Lucas Aerospace Power Transmission Company. The lever arm is generally L-shaped having an upright, vertical section 1352v (as shown in the drawings), and a horizontal section 1352h (also as shown in the drawings). The lever arm is pivotally mounted to frame 1344 at the outer end of horizontal arm section 1352h.

A moving means 1360 effects opening and closing of the valve and includes a solenoid 1362 having an annular coil 1364 and plunger 1366. The solenoid is mounted on and carded by frame 1344. The coil has a central core 1368 in which the plunger moves. The plunger is centered within central core 1368 using a spring plate 1370. Spring loaded positioner 1372 controls the degree of movement of the plunger and hence the lateral movement of the plunger. The plunger has a central bore 1374 extending inwardly into the plunger from an outer face 1376 thereof. A plate 1378 fits over the outer face of the plunger, and a spacer or collar 1380 sandwiches the plate against the outer end of a housing 1382 for the solenoid. A pin 1384 has one end received in bore 1374. The other end of the pin is attached to an arm 1386 of a flexible member 1388 carried on lever arm 1352. Member 1388 is U-shaped and has side pieces 1390 which fit against the respective sides of the lever arm. The member is attached to the lever arm by a pin 1392. The flexible arm extends from one of the side pieces to pin 1384. When an appropriate electrical input is supplied to the coil, the resultant electromagnetic field draws plunger 1366 to the fight, as viewed in FIG. 25. This movement effects a clockwise rotation of the lever arm about its pivot.

A vertically extending bore 1394 is formed in lever arm section 1352h, the bore being located directly above ball 1342. A plate 1396 is positioned for the underside of the plate to bear against ball 1342. Further, the plate has a stem 1398 received in bore 1394. Accordingly, as the lever arm is pivoted by energization of the solenoid, the movement of plate 1396 over ball 1342 produces an axial movement of valve 1332 to open orifice 1318 and allow fluid flow through the valve assembly.

A means 1400 is employed to preload lever arm 1352 with respect to the force exerted on the arm by solenoid 1362. A horizontal bore 1402 extends through frame 1344 at the upper end of the frame. Bore 1402 is counter-bored as indicated at 1404. Lever arm section 1352v has a circular recess 1406 formed in the inner face 1408 of the arm, opposite bore 1402. A spring 1410 is seated in this recess. The spring fits into counter-bore 1404 for the other end of the spring to fit into a seat 1412. The spring has a spring constant, and by using springs of differing spring constants, the range of control of the lever arm can be adjusted. An adjustment screw 1414 fits into bore 1402 and the screw is adjustable to vary the position of seat 1412, and hence the compressibility of spring 1410, as a function of the preloading force which lever arm 1352 must overcome in order to open valve 1332.

What has been described is a control valve and valve assembly for use in fluid flow control systems. The control valve employs a unique operational approach to achieve a high degree of resolution, and this is done without having to employ the level of force required employed by conventional control valves to achieve a similar degree of control. The valve is a pivot valve which operates to pivotally move a valve seat about a valve orifice to open the orifice. This is done instead of moving the valve seat linearly with respect to the orifice. The valve seat is attached to a valve stem which serves as part of a lever arm. A force is applied at the end of the lever arm remote from the valve seat so a much smaller force is required to obtain movement of the seat than is required in conventional control valves. The pivot control valve of the invention has a resolution thirteen times greater than that obtainable with conventional control valves. This higher degree of resolution is achieved by using a lateral force on the lever arm at a substantial distance from the valve seat. As a consequence, the control valve consumes less power than a comparable, conventional valve. In addition to being safe in operation, the pivot control valve can also be of a smaller size, is usable with a variety of different actuators, has an improved shut-off capability besides its improved resolution, is less sensitive to pressure changes, and has a relatively simple conversion between normally closed and normally open operation. Further, a solenoid used to effect movement of the valve member can be axially aligned with a plunger forming a portion of a lever arm used to move the valve member. Or, the solenoid can be mounted orthogonally or laterally to the plunger. Various types of valve constructions are described employing springs, bellows, and frictionless bearings, all to produce movement of a valve seat relative to an orifice.

In addition to the various embodiments described in which a valve member directly pivots on a valve seat or edge, a valve assembly for use in ultra-clean manufacturing environments is also disclosed. In this embodiment, the pivoting action occurs remote from the orifice to open and closed by the valve member. This is done to reduce wear and prevent the creation of sub-micron particles which otherwise could contaminate the process.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A valve assembly for use in a fluid flow system comprising:
   a valve body having a fluid flow passage formed therein including an inlet, an outlet, and an orifice interposed between said inlet and outlet;
   a freely movable valve member tiltable relative to said orifice between a valve closing position in which said valve member rests upon an edge extending about said orifice and a valve opening position;
   lever means supporting and tilting said valve member;
   a solenoid pivotally moving said lever means about a pivot for movement of said lever means to tilt said valve member to open a fluid flow path between said inlet and said outlet through said orifice; and,
   means contacting said lever means and said valve member and movable by said lever means when said lever means pivotally moves to tilt said valve member.

2. The valve assembly of claim 1 wherein said solenoid includes a flexible arm attached to said lever means to move said lever means about said pivot when said solenoid is energized.

3. The valve assembly of claim 3 further including means presetting a force which said lever means must overcome in order to tilt said valve member to the valve open position.

4. The valve assembly of claim 3 wherein said lever means comprises a lever arm pivoted at one end with said solenoid acting on said lever arm at a point intermediate the ends thereof, and said force presetting means acting on said lever arm at the end opposite the pivoted end of said lever arm.

5. The valve assembly of claim 1 wherein said lever means comprises a lever arm, and said valve assembly further includes a frame to which said lever arm is pivotally mounted, and wherein said frame and said valve body are attached to each other.

6. The valve assembly of claim 5 wherein said frame and said valve body form a fluid flow chamber into which said orifice opens, said valve member being positioned within said chamber.

7. The valve assembly of claim 6 further including a cap piece fitted between said frame and said valve body, said cap piece and a sidewall of said valve body defining said chamber.

8. The valve assembly of claim 5 wherein said valve member includes a valve seat positioned on said orifice and movable relative thereto to open and close the orifice.

9. The valve assembly of claim 8 wherein said valve member further includes a valve stem extending through an opening in said chamber, and said means contacting said lever means includes a ball mounted on an end of said stem, said ball contacting said lever arm for tilting said valve member.

10. The valve assembly of claim 9, wherein said lever means further includes a plate carded by said lever arm and contacting said ball to tilt said valve member.

11. A pivot valve assembly for use in ultra-clean manufacturing operations comprising:
   a valve body having a fluid flow passage formed therein including an inlet, an outlet, and an orifice interposed between said inlet and outlet;
   a valve member tiltable with respect to said orifice for opening and closing a fluid flow path between said inlet and outlet;
   ball means pivotally contacting one end of said valve member for movement of said ball means to effect lifting of said valve member;

a lever arm contacting said ball means to pivotally move said ball means, said ball means being unsecured to said lever arm; and, a solenoid pivotally moving said lever arm about a pivot for movement of said lever arm to tilt said valve member to open a fluid flow path between said inlet and said outlet through said orifice.

12. The pivot valve assembly of claim 11 wherein said solenoid includes a flexible arm attached to said lever arm to move said lever arm about said pivot when said solenoid is energized.

13. The pivot valve assembly of claim 12 further including means for presetting a force which said lever arm must overcome in order to tilt said valve member to the valve open position.

14. The pivot valve assembly of claim 12 further including a frame to which said lever arm is pivotally mounted, said frame and said valve body being attached to each other and forming a fluid flow chamber into which said orifice opens, said valve member being positioned within said chamber.

15. The pivot valve assembly of claim 14 wherein said valve member includes a valve seat positioned on said orifice and movable relative thereto to open and close the orifice.

16. The pivot valve assembly of claim 15 said valve member further includes a valve stem extending through an opening in said chamber and contacting said ball means.

17. The pivot valve assembly of claim 16 wherein said ball means includes a ball mounted on an end of said stem, said ball contacting said lever arm for tilting said valve member.

18. The pivot valve assembly of claim 17 further including a plate carried by said lever arm and contacting said ball to tilt said valve member.

19. A valve assembly for use in a fluid flow system comprising:

a valve body having a fluid flow passage formed therein including an inlet, an outlet, and an orifice interposed between said inlet and outlet;

a valve member movable relative to said orifice between a valve closing position in which said valve member rests upon an edge extending about said orifice and a valve opening position;

lever means supporting and moving said valve member;

a solenoid including a flexible arm attached to said lever means for pivotally moving said lever means about a pivot for movement of said lever means to move said valve member to open a fluid flow path between said inlet and said outlet through said orifice; and, means contacting said lever means and said valve member and movable by said lever means when said lever means pivotally moves to move said valve member.

20. The valve assembly of claim 19 further including means presetting a force which said lever means must overcome in order to move said valve member to the valve open position.

21. The valve assembly of claim 20 wherein said lever means comprises a lever arm pivoted at one end with said solenoid acting on said lever arm at a point intermediate the ends thereof, and said force presetting means acting on said lever arm at the end opposite the pivoted end of said lever arm.

22. The valve assembly of claim 19 wherein said lever means comprises a lever arm, and said valve assembly further includes a frame to which said lever arm is pivotally mounted, said frame and said valve body attached to each other, said frame and said valve body form a fluid flow chamber into which said orifice opens, said valve member being positioned within said chamber, and a cap piece fitted between said frame and said valve body, said cap piece and a sidewall of said valve body defining said chamber.

23. The valve assembly of claim 19 wherein said lever means comprises a lever arm, and said valve assembly further includes a frame to which said lever arm is pivotally mounted, said flame and said valve body attached to each other, said valve member including a valve seat positioned on said orifice and movable relative thereto to open and close the orifice and a valve stem extending through an opening in said chamber, and said means contacting said lever means including a ball mounted on an end of said stem, said ball contacting said lever arm for moving said valve member.

24. The valve assembly of claim 23 wherein said lever means further includes a plate carried by said lever arm and contacting said ball to move said valve member.

* * * * *

UNITED STATES PATENT AND TRADEMARK OFFICE
CERTIFICATE OF CORRECTION

PATENT NO. : 5,699,995

DATED : December 23, 1997

INVENTOR(S) : Walter D. Robertson

It is certified that error appears in the above-identified patent and that said Letters Patent is hereby corrected as shown below:

Col. 5, line 54
 replace "dram"
 with --drawn--.

Col. 12, line 46
 replace "dosing"
 with --closing--.

Col. 12, line 48
 replace "dram"
 with --drawn--.

Col. 15, line 48
 replace "dram"
 with --drawn--.

Col. 18, line 29
 replace "beating"
 with --bearing--.

Col. 18, line 39
 replace "carded"
 with --carried--.

Col. 20, line 55
 replace "carded"
 with --carried--.

UNITED STATES PATENT AND TRADEMARK OFFICE
CERTIFICATE OF CORRECTION

PATENT NO. : 5,699,995
DATED : December 23, 1997
INVENTOR(S) : Walter D. Robertson It is certified that error appears in the above-identified patent and that said Letters Patent is hereby corrected as shown below:

Col. 22, line 33
replace "flame"
with --frame--.

Signed and Sealed this

Twenty-sixth Day of May, 1998

Attest:

BRUCE LEHMAN

Attesting Officer

Commissioner of Patents and Trademarks